United States Patent
Reyes et al.

(10) Patent No.: US 9,447,314 B2
(45) Date of Patent: Sep. 20, 2016

(54) TREATMENT FLUIDS CONTAINING A PERFLUORINATED CHELATING AGENT AND METHODS FOR USE THEREOF

(71) Applicant: Halliburton Energy Services, Inc., Houston, TX (US)

(72) Inventors: Enrique Antonio Reyes, Tomball, TX (US); Aaron Michael Beuterbaugh, Spring, TX (US); Alyssa Lynn Smith, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 299 days.

(21) Appl. No.: 14/379,182

(22) PCT Filed: Oct. 8, 2013

(86) PCT No.: PCT/US2013/063888
§ 371 (c)(1),
(2) Date: Aug. 15, 2014

(87) PCT Pub. No.: WO2015/053753
PCT Pub. Date: Apr. 16, 2015

(65) Prior Publication Data
US 2016/0237339 A1 Aug. 18, 2016

(51) Int. Cl.
E21B 43/25 (2006.01)
C09K 8/74 (2006.01)
E21B 43/26 (2006.01)

(52) U.S. Cl.
CPC ............... C09K 8/74 (2013.01); E21B 43/25 (2013.01); E21B 43/26 (2013.01)

(58) Field of Classification Search
CPC .......... C09K 8/74; E21B 43/26; E21B 43/25
USPC .......... 166/308.1, 305.1, 308.2, 90.1, 250.1, 166/307
See application file for complete search history.

(56) References Cited

U.S. PATENT DOCUMENTS

| 4,079,011 A | 3/1978 | Tate |
| 4,454,914 A | 6/1984 | Watanabe |

(Continued)

FOREIGN PATENT DOCUMENTS

WO 2012127183 A1 9/2012

OTHER PUBLICATIONS

International Search Report and Written Opinion for PCT/US2014/037336 dated Sep. 24, 2014.

(Continued)

*Primary Examiner* — Catherine Loikith
*Assistant Examiner* — Silvana Runyan
(74) *Attorney, Agent, or Firm* — McDermott Will & Emery LLP; Craig Roddy

(57) ABSTRACT

Chelating agents used in conjunction with stimulation operations in a subterranean formation can often be limited by the pH range over which they may effectively complex metal ions. Perfluorinated chelating agents may have a broader effective pH range for metal ion complexation than do other types of chelating agents, particularly at highly acidic pH values. Methods for treating a subterranean formation can comprise: providing a treatment fluid comprising a perfluorinated chelating agent having at least two carboxylic acid groups; introducing the treatment fluid into a subterranean formation; and complexing metal ions in the subterranean formation with the perfluorinated chelating agent.

25 Claims, 4 Drawing Sheets

(56) References Cited

U.S. PATENT DOCUMENTS

| | | | |
|---|---|---|---|
| 4,983,566 | A | 1/1991 | Wieserman et al. |
| 5,246,073 | A * | 9/1993 | Sandiford ............ B01J 13/0065 |
| | | | 166/294 |
| 7,306,041 | B2 | 12/2007 | Milne et al. |
| 8,316,941 | B2 | 11/2012 | Frenier et al. |
| 9,051,510 | B1 * | 6/2015 | Reyes .................... C09K 8/035 |
| 2003/0119678 | A1 | 6/2003 | Crews |
| 2007/0235189 | A1 | 10/2007 | Milne et al. |
| 2009/0291863 | A1 | 11/2009 | Welton et al. |
| 2010/0048429 | A1 * | 2/2010 | Dobson, Jr. ............. E21B 43/25 |
| | | | 507/212 |
| 2010/0276152 | A1 | 11/2010 | De Wolf et al. |
| 2012/0267112 | A1 | 10/2012 | Zhang et al. |
| 2012/0322697 | A1 | 12/2012 | Zhang |
| 2013/0146292 | A1 | 6/2013 | Litvinets et al. |
| 2013/0213657 | A1 | 8/2013 | Dobson, Jr. et al. |
| 2013/0269941 | A1 | 10/2013 | Reyes et al. |
| 2014/0116696 | A1 | 5/2014 | Reyes |
| 2014/0367110 | A1 | 12/2014 | Montgomery et al. |
| 2014/0374107 | A1 | 12/2014 | Reyes et al. |

OTHER PUBLICATIONS

Burns et al., Experimental pka Determination for Perfluorooctanoic Acid (PFOA) and the Potential Impact of pka Concentration Dependence on Laboratory-Measured Partitioning Phenomena and Environmental Modeling, Environ. Sci. Technol. 2008, 42 (24): 9283-8.

Lee et al., Decomposition of Perfluorooctanoic Acid by Microwave-Activated Persulfate: Effects of Temperature, pH, and Chloride Ions, Frontiers of Environmental Science and Engineering, 2012, vol. 6, Iss. 1, pp. 17-25.

International Search Report and Written Opinion for PCT/US2013/063888 dated Jul. 24, 2014.

Hori et al., Efficient Decomposition of Perfluorocarboxylic Acids and Alternative Fluorochemical Surfactants in Hot Water, Environ. Sci. Technol. (2008), 42, 7438-7443.

Panchangam et al., Decomposition of Perfluorocarboxylic Acids (PFCAs) by Heterogeneous Photocatalysis in Acidic Aqueous Medium, Chemosphere 77 (2009) 242-248.

\* cited by examiner

TREATMENT FLUIDS CONTAINING A PERFLUORINATED CHELATING AGENT AND METHODS FOR USE THEREOF

BACKGROUND

The present disclosure generally relates to stimulation of subterranean formations, and, more specifically, to methods for complexing metal ions in a subterranean formation with a perfluorinated chelating agent to decrease the occurrence of precipitation in the subterranean formation.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Downhole acidizing operations and other dissolution operations may be used to stimulate a subterranean formation to increase production of a hydrocarbon resource therefrom. During an acidizing operation or a like dissolution operation, an acid-soluble material in the subterranean formation may be dissolved by one or more acids to expand existing flow pathways in the subterranean formation, to create new flow pathways in the subterranean formation, and/or to remove acid-soluble precipitation damage in the subterranean formation, thereby stimulating the formation's production capabilities. Introduction of an acidizing fluid to a subterranean formation may take place at matrix flow rates without fracturing of the formation matrix or at higher injection rates and pressures to fracture the formation. The acid-soluble material being dissolved by the acid(s) may be part of or formed from the native formation matrix or have been deliberately introduced into the subterranean formation in conjunction with a stimulation or like treatment operation (e.g., bridging agents, proppants, or gravel particulates). Illustrative substances within the native formation matrix that may be dissolved by an acid include, but are not limited to, carbonates, silicates and aluminosilicates, which may be present alone or in combination with one another in formations of mixed mineralogy. Other substances may also be dissolved during the course of performing an acidizing operation, and the foregoing substances should not be considered to limit the scope of substances that may undergo acidization.

Carbonate formations can contain minerals that comprise a carbonate anion (e.g., calcite (calcium carbonate), dolomite (calcium magnesium carbonate), and siderite (iron carbonate)). When acidizing a carbonate formation, the acidity of the treatment fluid alone may often be sufficient to solubilize the carbonate material by decomposing the carbonate anion to carbon dioxide and leeching a metal ion into the treatment fluid. Both mineral acids (e.g., hydrochloric acid) and organic acids (e.g., acetic and formic acids) may be used to treat a carbonate formation, often with similar degrees of success. Since it is relatively inexpensive, hydrochloric acid is very commonly used, typically in concentrations up to about 28% by volume.

Siliceous formations can include minerals such as, for example, zeolites, clays, and feldspars. As used herein, the term "siliceous" refers to a substance having the characteristics of silica, including silicates and/or aluminosilicates. Dissolution of siliceous materials through acidization is thought to be considerably different than acidizing carbonate materials, since the acids that can be effective for acidizing carbonate materials may have little effect on siliceous materials. In contrast, hydrofluoric acid, another mineral acid, can react very readily with siliceous materials to promote their dissolution. Oftentimes, a mineral acid or an organic acid can be used in conjunction with hydrofluoric acid to maintain a low pH state as the hydrofluoric acid becomes spent during dissolution of a siliceous material, where the low pH state helps promote continued solubilization of the siliceous material. Many types of siliceous formations can also contain varying amounts of carbonate materials. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). When siliceous materials are co-present with carbonate materials, significant precipitation issues can sometimes be encountered, as discussed below.

In some instances, it can be desirable to remove a carbonate material from a siliceous formation prior to acidizing the siliceous material therein to decrease the occurrence of precipitation in the subterranean formation. For example, calcium ions liberated from the carbonate material can react readily with fluoride ions from hydrofluoric acid to form highly insoluble calcium fluoride, which can often be more damaging to the subterranean formation than if the acidizing operation had not been performed in the first place. Different metal ions liberated from other carbonate materials can also be problematic in this regard. Metal ions liberated from aluminosilicates and other metal-containing siliceous materials may also be problematic in this regard.

Another approach that can be used to address the presence of metal ions in a subterranean formation is to employ chelating agents that effectively sequester any problematic metal ions in a metal-ligand complex, such that they are substantially unable to undergo a further reaction to produce calcium fluoride or other types of metal-containing precipitates. As used herein, the terms "complex," "complexing," "complexation" and other variants thereof refer to the formation of a metal-ligand bond. Although complexation of a metal ion may involve a chelation process in some embodiments, complexation is not deemed to be limited in this manner. Chelating agents may also directly dissolve a carbonate material without first liberating the metal ions therefrom, even in the absence of another acid, and function in a similar manner to mitigate the formation of metal-containing precipitates. Although precipitation can be a particular concern when acidizing a siliceous material, chelating agents may also be used with similar benefits in conjunction with acidizing subterranean formations that comprise substantially only a carbonate material by limiting the formation of carbonate scale. Likewise, complexation of metal ions liberated from siliceous materials may also be desirable.

One difficulty that may be encountered with chelating agents is that they usually exhibit a relatively limited pH range over which they may effectively complex metal ions to form a metal-ligand complex. Chelating agents comprising carboxylic acids, for example, may be inactive for metal-ion complexation at pH values below the pKa(s) of their carboxylic acid groups, since the carboxylic acid groups may be substantially protonated at such pH values and unable to donate a lone pair of electrons for forming a metal-ligand bond. For many common chelating agents comprising carboxylic acid groups, the pKa values of the carboxylic acids reside in the 3-5 range. Even the most acidic carboxylic acids in common chelating agents only reside in the 1.5-2.5 pKa range. Thus, many conventional chelating agents are believed to be inactive for metal ion complexation at the initial pH values of highly acidic acidizing fluids (e.g., a pH of less than about 2). Hence, metal ion complexation at low pH values remains a persistent issue that has not yet been effectively solved.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
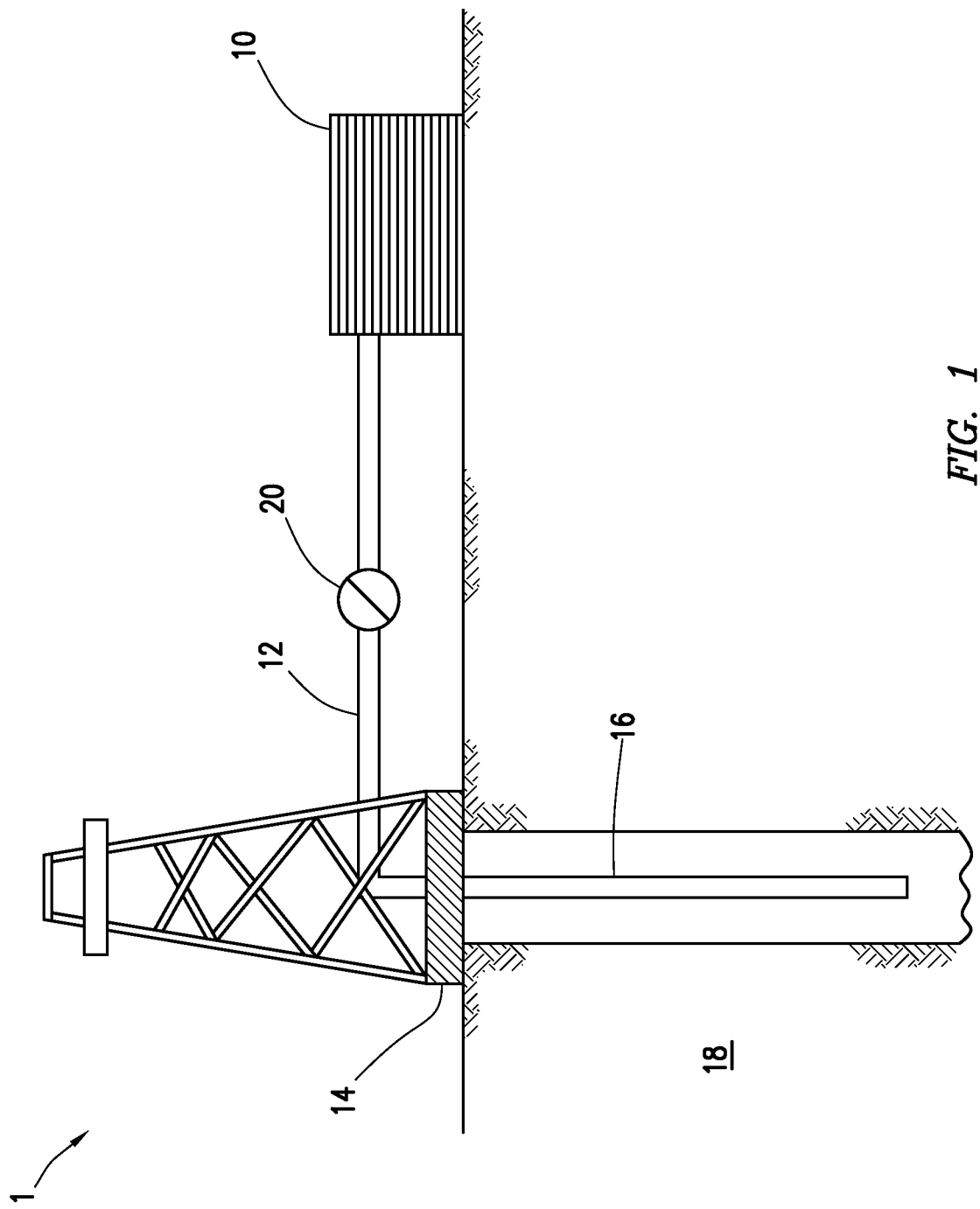
FIG. 1 shows an illustrative schematic of a system that can deliver treatment fluids of the present disclosure to a downhole location.

The present disclosure generally relates to stimulation of subterranean formations, and, more specifically, to methods for complexing metal ions in a subterranean formation with a perfluorinated chelating agent to decrease the occurrence of precipitation in the subterranean formation.

One or more illustrative embodiments incorporating the disclosure herein are presented below. Not all features of an actual implementation are described or shown in this application for the sake of clarity. It is to be understood that in the development of an actual embodiment incorporating the present disclosure, numerous implementation-specific decisions must be made to achieve the developer's goals, such as compliance with system-related, business-related, government-related and other constraints, which vary by implementation and from time-to-time. While a developer's efforts might be complex and time-consuming, such efforts would be, nevertheless, a routine undertaking for one having ordinary skill in the art and the benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claim, each numerical parameter should at least be construed in light of the number of reported significant digits and by applying ordinary rounding techniques.

The present inventors recognized that in order to conduct more vigorous acidizing operations with low pH acidizing fluids while still enjoying the benefits of metal ion complexation, a significant departure in structure from conventional chelating agents (e.g., aminopolycarboxylic acids) would be needed, at least during the initial stages of an acidizing process. To this end, the inventors recognized that halogenated dicarboxylic acids, especially those possessing halogenation on the carbon atoms adjacent to the carboxylic acid groups, exhibit much lower pKa values than do their non-halogenated counterparts and may be more effective for complexing metal ions at low pH values as a result. More specifically, the inventors recognized that perfluorinated chelating agents may be an especially effective class of halogenated chelating agents due to several advantages that these types of compounds may provide. As used herein, the term "perfluorinated" refers to a compound having two or more fluorine atoms, without reference to the location of the fluorine atoms in the compound's molecular structure. In some embodiments, the term "perfluorinated" refers to an organic compound in which all carbon-hydrogen bonds have been replaced with carbon-fluorine bonds. Without being bound by any theory or mechanism, it is believed that the very high electronegativity of multiple fluorine atoms in such compounds may withdraw electron density from carboxylate anions, thereby stabilizing the anions and facilitating their formation. As a result of such stabilization through withdrawal of electron density, the pKa value of the carboxylic acids may be lowered. The effects of perfluorination adjacent to the carboxylic acid groups in the chelating agents described herein may allow their carboxylic acids to become essentially fully deprotonated in water or a like aqueous medium, thereby allowing the chelating agents to become active for complexing metal ions, even at very low pH values.

Although it is believed that fluorination adjacent to the carboxylic acid groups in chelating agents is most effective for lowering their pKa values, more extensive fluorination of the chelating agents in other locations may further increase the acidity of their carboxylic acid groups. More extensive fluorination may also be beneficial in other aspects. Although even a modest amount of fluorination (e.g., fluorination only adjacent to the carboxylic acid groups in a dicarboxylic acid chelating agent) may change the surface tension of a treatment fluid formed from a fluorinated chelating agent, even more extensive fluorination may further enhance this effect. Specifically, extensive fluorination of a chelating agent may be sufficient to significantly change the solubility properties of the chelating agent and lower the surface tension of a treatment fluid formed therefrom. In addition, perfluorination may change the wetting properties of a subterranean formation to which the chelating agent has been introduced. Moreover, perfluorinated compounds typically have exceptionally high thermal stability values, so that they may be used to treat high temperature subterranean formations, such as those having a temperature greater than about 400° F.

In addition to the foregoing advantages, perfluorinated chelating agents may also be used in combination with other types of chelating agents to significantly extend the pH range over which metal ion complexation may effectively take place. Specifically, by using a perfluorinated chelating agent in a treatment operation, an initial low pH complexation of metal ions may take place during the initial stages of the treatment operation, and as the pH rises upon spending of an acid, the other chelating agent may then become active for complexing metal ions. Employing such a strategy may allow the cost of a treatment operation to be decreased by utilizing a less expensive chelating agent in the higher pH realm, where specialized complexation properties are believed to be less needed.

In certain embodiments, a perfluorinated chelating agent may be used in combination with an aminopolycarboxylic acid chelating agent to broaden the pH range over which metal ion complexation takes place. Such a strategy may also improve the environmental profile of the treatment operation, since many aminopolycarboxylic acid chelating agents are biodegradable. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. In addition, such a strategy may also allow an aminopolycarboxylic acid to exert beneficial effects during an acidizing operation even in a pH regime where it is initially inactive for complexing metal ions, as described in commonly owned U.S. patent application Ser. No. 13/925,888, filed on Jun. 25, 2013 and incorporated herein by reference in its entirety. Specifically, an initially inactive aminopolycarboxylic acid chelating agent may slow the rate of acidizing in a subterranean formation and promote the formation of wormholes therein.

Perfluorinated chelating agents of the present disclosure may also be used in combination with perfluorinated acids in some embodiments, which can provide further advantages. Specifically, in some embodiments, perfluorinated chelating agents may be used in combination with perfluorinated monocarboxylic acids. Perfluorinated monocarboxylic acids are similarly much more acidic than are their non-fluorinated counterparts, thereby allowing a greater degree of acidity to be attained in a treatment fluid with a lesser amount of acid. The opportunity to utilize lower amounts of acid may also improve the environmental favorability of a treatment operation. Moreover, perfluorinated acids may decrease the surface tension of a treatment fluid formed therefrom in a like manner to that described above for perfluorinated chelating agents.

As used herein, the terms "formation" or "subterranean formation" refer to a body or section of geologic strata, structure, formation or other subsurface solid or collected material that is sufficiently distinctive and continuous with respect to other geologic strata or characteristics that it can be mapped, for example, by seismic techniques. A formation can be a body of geologic strata of predominantly one type or a combination of types, or a fraction of strata having a substantially common set of characteristics. A formation can contain one or more hydrocarbon-bearing zones. The terms "formation," "subterranean formation," "hydrocarbon-bearing subterranean formation," "reservoir," and "interval" may be used interchangeably with one another herein, but may generally be used to denote progressively smaller subsurface regions, zones, or volumes. More specifically, a geologic formation may generally be the largest subsurface region, a subterranean formation may generally be a region within the geologic formation and may generally be a hydrocarbon-bearing zone, and an interval may generally refer to a sub-region or portion of a reservoir. A hydrocarbon-bearing zone can be separated from other hydrocarbon-bearing zones by zones of lower permeability such as mudstones, shales, or shale-like (highly compacted) sands. In one or more embodiments, a hydrocarbon-bearing zone may include heavy oil in addition to sand, clay, or other porous solids.

As used herein, the term "hydrocarbons" generally refers to molecules formed primarily from carbon and hydrogen atoms, such as oil and natural gas. In some embodiments, hydrocarbons may be substituted with other elements such as, for example, halogens, metallic elements, nitrogen, oxygen, and/or sulfur. In other embodiments, they may be unsubstituted and contain only carbon and hydrogen. Hydrocarbons may be produced from subterranean formations through wells penetrating a hydrocarbon-containing formation. Hydrocarbons derived from a hydrocarbon-bearing subterranean formation may include, but are not limited to, kerogen, bitumen, pyrobitumen, asphaltic or tar oil, crude oils, natural gases, and any combination thereof. Hydrocarbons may be located within or adjacent to mineral matrices within the earth. Mineral matrices may include, but are not limited to, sedimentary rock, sands, silicilytes, carbonates, diatomites, and other porous media.

In various embodiments, treatment fluids containing a perfluorinated chelating agent and methods for use thereof are described herein. In some embodiments, the treatment fluids described herein can comprise a perfluorinated chelating agent having at least two carboxylic acid groups. Further disclosure regarding suitable perfluorinated chelating agents containing carboxylic acid groups follows hereinbelow.

In some embodiments, the treatment fluids described herein may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine a suitable aqueous carrier fluid for utilization in the embodiments described herein.

In some embodiments, an organic co-solvent may be included with an aqueous carrier fluid containing a perfluorinated chelating agent. Suitable organic co-solvents may include, but are not limited to, glycols and alcohol solvents, for example. When present, the amount of the organic co-solvent may range between about 1% to about 50% by volume of the treatment fluid. Considerations for including an organic co-solvent may include, for example, the solubility of the perfluorinated chelating agent or other treatment fluid component in an aqueous carrier fluid.

In other various embodiments, the treatment fluids described herein may comprise an oleaginous carrier fluid as their continuous phase. Suitable oleaginous carrier fluids may include, for example, an organic solvent, a hydrocarbon, oil, a refined component of oil, or any combination thereof. Oleaginous carrier fluids may be utilized when the perfluorinated chelating agent or another treatment fluid component is not sufficiently soluble in an aqueous carrier fluid.

In some embodiments, the treatment fluids described herein may further comprise a surfactant that increases the miscibility of the perfluorinated chelating agent with the carrier fluid. Suitable surfactants are not believed to be particularly limited and may comprise cationic, anionic, zwitterionic, and/or neutral surfactants. When present, an amount of the surfactant in the treatment fluid may be less than about 10% by weight of the treatment fluid, with a typical range of between about 0.5% to about 5% by weight of the treatment fluid being used.

In various embodiments, the treatment fluids described herein may comprise a perfluorinated chelating agent that comprises a dicarboxylic acid having a difluorinated methylene group adjacent to each carboxylic acid group. In some embodiments, additional fluorination may be present in the perfluorinated dicarboxylic acid. In some embodiments, the perfluorinated chelating agent may comprise one or more ether functionalities in a perfluorinated carbon chain linking the carboxylic acid groups to one another. In various embodiments, suitable perfluorinated chelating agents may include commercially available perfluorinated dicarboxylic acid chelating agents, such as the following:

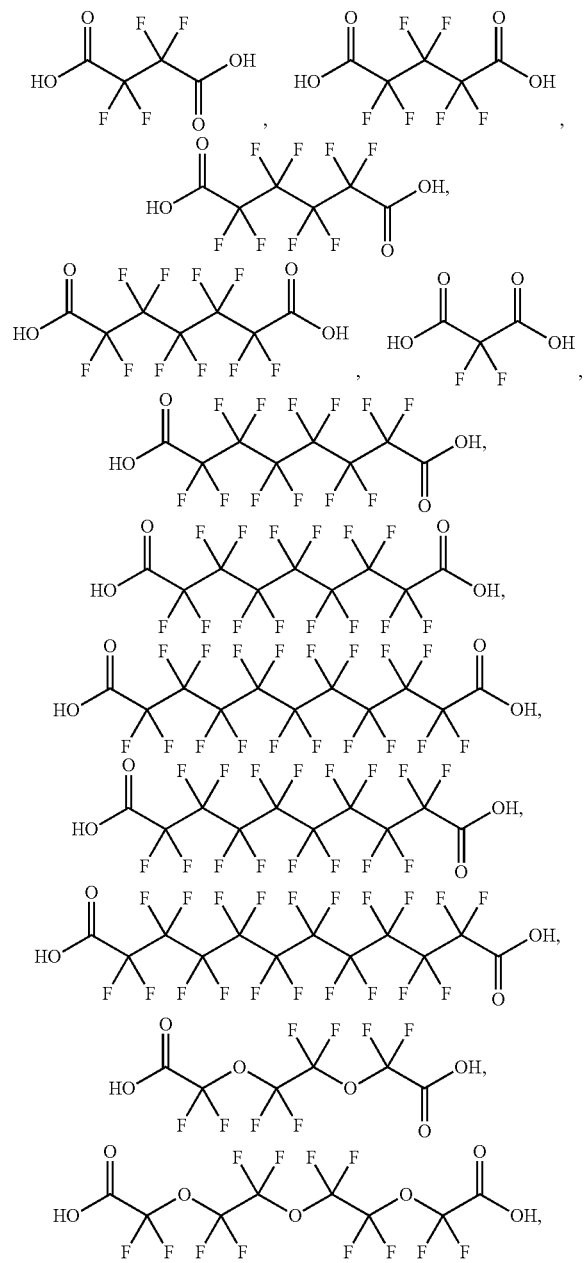

and any combination thereof. Other suitable perfluorinated chelating agents, including those not commercially available, may be envisioned by one having ordinary skill in the art. Moreover, one having ordinary skill in the art will recognize suitable techniques for synthesizing such perfluorinated chelating agents.

In some embodiments, the treatment fluids described herein may further comprise a second chelating agent, which comprises one fluorine group or less. As discussed above, the second chelating agent may be more active for metal ion complexation at higher pH values than at the initial pH of the treatment fluid. The nature of the second chelating agent is not believed to be particularly limited in scope.

In some embodiments, the second chelating agent may comprise an aminopolycarboxylic acid, a number of which are biodegradable at least to some degree. As used herein, the term "aminopolycarboxylic acid" refers to a compound having one or more amino groups and two or more carboxylic acid groups. In this regard, suitable aminopolycarboxylic acid chelating agents having some measure of biodegradability may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N'''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. Particularly suitable biodegradable chelating agents that may be used in the treatment fluids described herein include, for example, MGDA, GLDA, EDDS, β-ADA, IDS, TCA6, BCA3, BCA5, BCA6, MCBA3, and MCBA5.

In some embodiments, as an alternative to aminopolycarboxylic acid chelating agents, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be included in the treatment fluids described herein as the second chelating agent.

In some or other alternative embodiments, suitable chelating agents that may comprise the second chelating agent include hydroxamates, as described in commonly owned U.S. patent application Ser. No. 13/663,825, filed on Oct. 30, 2012 and incorporated herein by reference in its entirety. In some or other alternative embodiments, suitable chelating agents that may comprise the second chelating agent include pyridinecarboxylic acids, as described in commonly owned U.S. patent application Ser. No. 13/837,090, filed on Apr. 3, 2013 and incorporated herein by reference in its entirety.

In general, the total concentration of chelating agent in the treatment fluids may be dictated by the quantity of metal ions needing sequestration in the course of conducting a particular treatment operation, as well as the solubility of the chelating agent(s) in the treatment fluid. The total concentration of chelating agent in the treatment fluids represents the concentration of the perfluorinated chelating agent plus the quantity of any second chelating agent that may be present. In various embodiments, a total concentration of chelating agent in the treatment fluid may range between about 0.1% to about 20% by weight of the treatment fluid. In more particular embodiments, a concentration of the chelating agent in the treatment fluid may range between about 1% to about 15% by weight of the treatment fluid, or between about 1% to about 5% by weight of the treatment fluid, or between about 1% to about 10% by weight of the treatment fluid, or between about 5% to about 10% by weight of the treatment fluid, or between about 5% to about 15% by weight of the treatment fluid.

In some embodiments, the treatment fluids described herein may be acid-free other than the carboxylic acid groups that are present on the perfluorinated chelating agent. That is, in some embodiments, the treatment fluids may contain no other acids or acid-generating compounds. When no additional acids are present, the perfluorinated chelating agent may interact directly with a surface containing metal ions to affect its dissolution via complexation of the metal ions, such as a carbonate material that is present in a subterranean formation. Similarly, the perfluorinated chelating agent in an acid-free treatment fluid may interact with dissolved metal ions to affect their sequestration, as described in more detail hereinabove.

In other various embodiments, the treatment fluids described herein may further comprise another acid or acid-generating compound in addition to the carboxylic acid groups present on the perfluorinated chelating agent. Inclusion of an additional acid in the treatment fluids may result in a more vigorous dissolution of a surface (e.g., in a subterranean formation) containing metal ions than is promoted by the perfluorinated chelating agent alone. For example, in some embodiments, dissolution of a carbonate material may be promoted by reaction with an acid in the treatment fluids described herein, and the metal ions liberated from the carbonate material may undergo a subsequent reaction with the perfluorinated chelating agent to affect their sequestration. In some embodiments, a perfluorinated chelating agent that is co-present with an acid may also promote direct dissolution of a carbonate material, as described above. Similarly, in some embodiments, metal ions in a siliceous material may be complexed by the perfluorinated chelating agent when hydrofluoric acid or a hydrofluoric acid-generating compound is present.

In various embodiments, the amount of additional acid in the treatment fluids described herein may range between about 1% to about 20% of the treatment fluid by weight. In more particular embodiments, the amount of additional acid in the treatment fluids may range between about 1% to about 10% of the treatment fluid by weight.

When an additional acid is present, the treatment fluids may comprise a mineral acid or an organic acid. Suitable mineral acids may include, but are not limited to, hydrochloric acid and hydrobromic acid. Suitable organic acids may include, but are not limited to, formic acid, acetic acid, methanesulfonic acid, chloroacetic acid, dichloroacetic acid, trichloroacetic acid, fluoroacetic acid, difluoroacetic acid, trifluoroacetic acid, and any combination thereof. Acid-generating compounds may also be used in the treatment fluids in a comparable manner. Examples of suitable acid-generating compounds that may be used in some embodiments described herein include, for example, esters, aliphatic polyesters, orthoesters, poly(orthoesters), poly (lactides), poly(glycolides), poly(ε-caprolactones), poly (hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

Hydrofluoric acid is not generally used as a mineral acid for promoting dissolution of carbonate materials, but it may be present if the treatment fluid is being used to treat a siliceous material to affect its dissolution. Hydrofluoric acid-generating compounds may also be used in a like manner. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), and various boron trifluoride complexes.

In some embodiments, the amount of hydrofluoric acid in the treatment fluids may range between about 1% to about 10% of the treatment fluid by weight. In other embodiments, the treatment fluids may be substantially free of hydrofluoric acid.

In still more particular embodiments, the treatment fluids described herein may further comprise a perfluorinated acid. In more specific embodiments, the perfluorinated acid may comprise a monocarboxylic acid having two or more fluorine groups. In various embodiments, suitable perfluorinated acids may include commercially available perfluorinated carboxylic acids, such as the following:

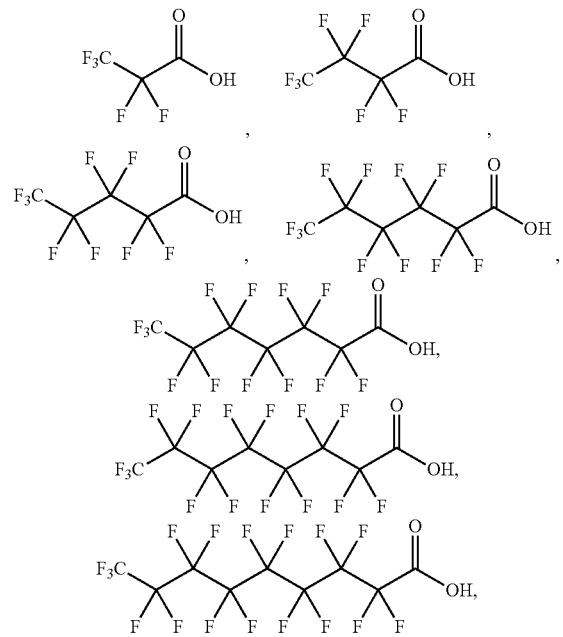

-continued

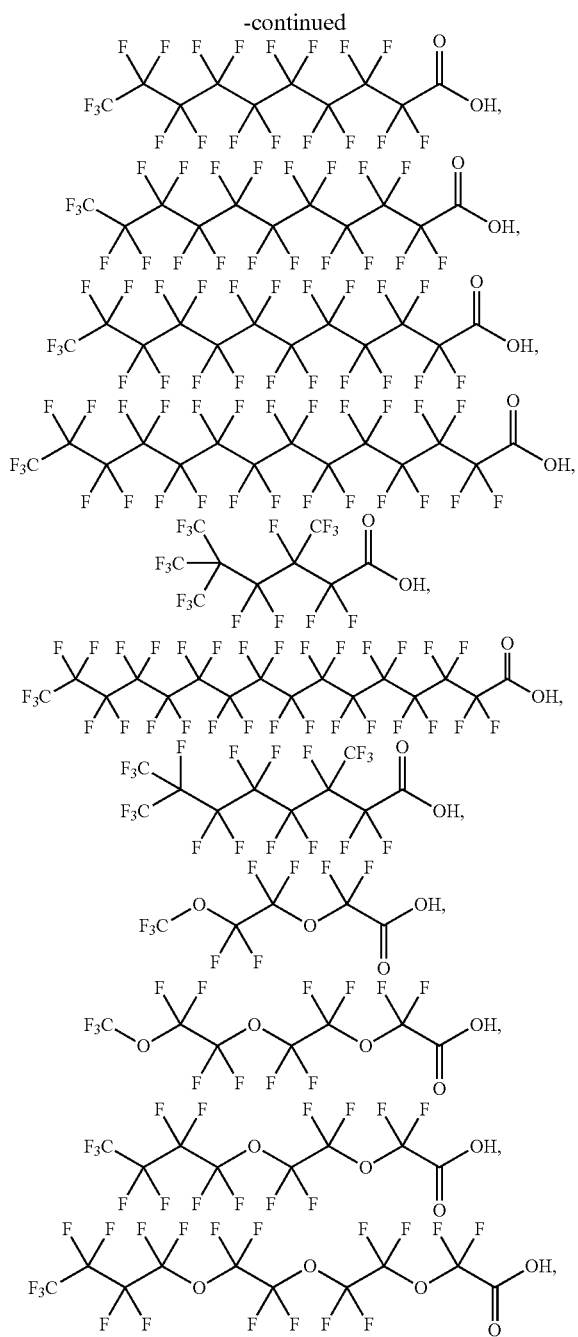

and any combination thereof. Other suitable perfluorinated carboxylic acids, including those not commercially available, may be envisioned by one having ordinary skill in the art. Moreover, one having ordinary skill in the art will recognize suitable techniques for synthesizing such perfluorinated carboxylic acids.

The treatment fluids described herein can exhibit a wide range of initial pH values. The pH of the treatment fluids may be influenced by factors including, for example, the concentration of the perfluorinated chelating agent or any additional acid(s) that may be present. Factors that may be taken into account in determining a suitable initial pH for a particular treatment fluid include, for example, the composition of a surface being treated and the desired dissolution rate. In various embodiments, the treatment fluids described herein can have an initial pH value of about 4 or lower, or about 3.5 or lower, or about 3 or lower, or about 2.5 or lower, or about 2 or lower, or about 1.5 or lower, or about 1 or lower. In some embodiments, the initial pH of the treatment fluids may range between about 0 and about 4, or between about 0 and about 2, or between about 1 and about 4, or between about 1 and about 3, or between about 2 and about 4.

In some embodiments, the treatment fluids described herein may have a pH that is initially below the pKa values of the carboxylic acid groups comprising a second chelating agent, such as an aminopolycarboxylic acid chelating agent. At such pH values, the second chelating agent may be initially inactive for complexing metal ions. As described above, however, certain benefits may still be realized by formulating a treatment fluid with an initially inactive chelating agent, not the least of which is tempering the reaction rate of the treatment fluid with a surface comprising a carbonate material. The decreased reaction rate may promote the generation of wormholes in the carbonate material, rather than the bulk erosion that can occur at more rapid reaction rates. As the treatment fluid becomes at least partially spent and the pH of the treatment fluid rises, the second chelating agent may once again become active for complexing metal ions as its carboxylic acid groups become deprotonated, thereby allowing the second chelating agent to serve dual effects in a treatment operation. Similar benefits may also be realized when treating a surface of mixed mineralogy, such as a surface containing both a carbonate material and a siliceous material.

In other various embodiments, the treatment fluids described herein may have a pH that is initially above the pKa values of the carboxylic acid groups comprising the second chelating agent. In such embodiments, both the perfluorinated chelating agent and the second chelating agent may be active for complexing metal ions from the outset of a treatment operation.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

In some embodiments, the treatment fluids described herein can be utilized in matrix dissolution operations. That is, in some embodiments, the treatment fluids described herein can be introduced to a subterranean formation below a fracture gradient pressure of the subterranean formation. In some such embodiments, the interaction of the treatment fluid with the formation matrix may result in the desirable formation of wormholes therein. In other embodiments, the treatment fluids described herein can be introduced to a subterranean formation at or above a fracture gradient pressure of the subterranean formation, such that one or more fractures are created or enhanced in the subterranean formation as a result of the treatment. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

As used herein, the term "fracture gradient pressure" refers to an equivalent fluid pressure sufficient to create or enhance one or more fractures in the subterranean formation. As used herein, the "fracture gradient pressure" of a layered formation also encompasses a parting fluid pressure sufficient to separate one or more adjacent bedding planes in a layered formation. It should be understood that one of ordinary skill in the art may perform a simple leak-off test on a core sample of a formation to determine the fracture gradient pressure of a particular formation.

As used herein, the term "fracture" refers to a crack, delamination, surface breakage, separation, crushing, rubblization, or other destruction within a geologic formation or fraction of formation not related to foliation or cleavage in metamorphic formation, along which there has been displacement or movement relative to an adjacent portion of the formation. A fracture along which there has been lateral displacement may be termed a fault. When walls of a fracture have moved only normal to each other, the fracture may be termed a joint. Fractures may enhance permeability of rocks greatly by connecting pores together, and for that reason, joints and faults may be induced mechanically in some reservoirs in order to increase fluid flow.

In some embodiments, methods described herein may comprise providing a treatment fluid comprising a perfluorinated chelating agent having at least two carboxylic acid groups; introducing the treatment fluid into a subterranean formation; and complexing metal ions in the subterranean formation with the perfluorinated chelating agent.

In various embodiments, the subterranean formation may comprise a carbonate material. The carbonate material may occur natively in the subterranean formation, or it can have been introduced to the subterranean formation in the course of performing a treatment operation. In some embodiments, the subterranean formation can comprise primarily a carbonate material such as calcite, dolomite, or siderite. In some embodiments, the subterranean formation may comprise a carbonate formation such as, for example, a chalk formation or a limestone formation. In other embodiments, the subterranean formation may comprise a mixed mineralogy, such as a mixture of a siliceous material and a carbonate material.

In various embodiments, the methods may further comprise dissolving at least a portion of a carbonate material in the subterranean formation with the treatment fluid. In such embodiments, at least a portion of the metal ions being complexed in the subterranean formation may arise from dissolution of the carbonate material. Illustrative metal ions that can result from dissolution of a carbonate material include, for example, calcium ions, magnesium ions, iron ions, and any combination thereof. Dissolution of the carbonate material may take place through the action of an acid that may be present in the treatment fluid, or the chelating agent may interact directly with the carbonate material without the influence of another acid to affect dissolution. Combinations of these dissolution processes are also possible. Specifically, in some embodiments, dissolving at least a portion of a carbonate material may comprise a dissolution process selected from the group consisting of decomposing a carbonate anion comprising the carbonate material with hydrogen ions, complexing a metal ion comprising the carbonate material with the perfluorinated chelating agent, and any combination thereof. Other sources of metal ions in the subterranean formation are also possible, and complexation of problematic metal ions from these alternative sources are also contemplated by the embodiments described herein. For example, metal ions resulting from corrosion can also be complexed according to the embodiments described herein.

Similarly, in some embodiments, the methods described herein may further comprise dissolving a siliceous material in the subterranean formation. The treatment fluid may comprise hydrofluoric acid or a hydrofluoric acid-generating compound in such embodiments. Specifically, the methods may comprise dissolving the siliceous material with the treatment fluid in the presence of the metal ions. In some embodiments, the metal ions in the subterranean formation may be generated from the siliceous material. For example, illustrative metal ions that may arise from dissolution of a siliceous material include, for example, aluminum ions, calcium ions, and any combination thereof. In other embodiments, the metal ions may arise from dissolution of a carbonate material in formations of mixed mineralogy.

In some embodiments, the methods described herein may further comprise producing a metal-ligand complex formed from the perfluorinated chelating agent from the subterranean formation. Production of the metal-ligand complex may allow the metal ions to be removed from the subterranean formation before they are able to produce further deleterious effects. For example, in some embodiments, removal of metal ions from the subterranean formation may prevent scaling by a reaction product of the metal ions. In some or other embodiments, the metal ions may be produced from the subterranean formation before a subsequent treatment operation is performed. For example, in some embodiments, a carbonate material may be removed from a subterranean formation that also contains a siliceous material, before the siliceous material is dissolved using hydrofluoric acid or a hydrofluoric acid-generating compound, thereby decreasing the likelihood of precipitation occurring in the presence of hydrofluoric acid.

In some embodiments, the methods described herein may further comprise introducing a second chelating agent to the subterranean formation, where the second chelating agent comprises one fluorine group or less. Suitable chelating agents that may comprise the second chelating agent include, but are not limited to, those set forth above. In some embodiments, the second chelating agent may be active for complexing metal ions at a pH above which the perfluorinated chelating agent is active for complexing metal ions. Specifically, in some embodiments, the second chelating agent may be active for complexing metal ions at a pH of about 2 or above. In more specific embodiments, the second chelating agent may be inactive for complexing metal ions at the initial pH of the treatment fluid comprising the perfluorinated chelating agent, but become active as the treatment fluid at least partially spends and its pH rises. In some embodiments, the methods described herein may further comprise complexing metal ions in the subterranean formation with the second chelating agent at a pH of about 2 or above.

In some embodiments, the second chelating agent may be introduced to the subterranean formation subsequent to the perfluorinated chelating agent. In other embodiments, the second chelating agent may be introduced to the subterranean formation at the same time as the perfluorinated chelating agent. In some embodiments, the second chelating agent may be introduced to the subterranean formation in the same treatment fluid in which the perfluorinated chelating agent is present.

In some embodiments, methods described herein may comprise: providing a treatment fluid comprising an aqueous carrier fluid and a perfluorinated chelating agent having at least two carboxylic acid groups, the treatment fluid having an initial pH of about 2 or lower; introducing the treatment fluid into a subterranean formation comprising a carbonate material; dissolving at least a portion of the carbonate material with the treatment fluid; and complexing metal ions in the subterranean formation with the perfluorinated chelating agent.

In some embodiments, the treatment fluid may be introduced to the subterranean formation below a fracture gradient pressure of the subterranean formation. At such introduction pressures, the treatment fluid may form wormholes in a carbonate material in some embodiments, or result in bulk erosion of a carbonate material in other embodiments. One of ordinary skill in the art will recognize the circumstances under which wormhole generation or bulk surface erosion is more desirable. In some embodiments, reacting the acid with a carbonate material in the presence of the chelating agent may comprise interacting the acid with the carbonate material in a manner to form one or more wormholes therein. Matrix dissolution of a siliceous material may also occur under these conditions.

In other embodiments, the treatment fluid may be introduced to the subterranean formation at a pressure at or above a fracture gradient pressure of the subterranean formation. Although wormhole generation is not as likely in such embodiments, the other features and advantages of the methods described herein may still be realized.

In other various embodiments, systems configured for delivering the treatment fluids described herein to a downhole location are described. In various embodiments, the systems can comprise a pump fluidly coupled to a tubular, the tubular containing a treatment fluid comprising a perfluorinated chelating agent having at least two carboxylic acid groups, and the treatment fluid having an initial pH of about 2 or lower.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the fluid to enter into the subterranean formation. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from the subterranean formation.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In various embodiments, the treatment fluids described herein may be used in conjunction with a stimulation operation conducted in a subterranean formation. The treatment fluids may be delivered downhole using the illustrative systems described hereinabove. In some embodiments, the stimulation operation can comprise a fracturing operation. In some or other embodiments, the stimulation operation can comprise an acidizing operation. In some embodiments, the treatment fluids described herein may be used in conjunction with a remediation operation conducted in a subterranean formation. Each of the foregoing treatment operations is discussed in more detail hereinbelow.

In some embodiments, the treatment fluids described herein may be used to treat a proppant pack or a gravel pack in a subterranean formation in order to increase its permeability. In some embodiments, the treatment fluids may be used to treat an existing fracture in a subterranean formation in order to enhance a flow pathway therein. In some embodiments, the treatment fluids may be used in the course of creating or extending a fracture in a subterranean formation by introducing the treatment fluid at or above a fracture gradient pressure of the subterranean formation.

In some embodiments, the treatment fluids may be used to remediate a subterranean formation that has precipitation or accumulation damage therein. As used herein, the term "precipitation or accumulation damage" refers to a material that has been dissolved in a subterranean formation and deposited elsewhere within the subterranean formation, optionally after undergoing a further reaction. That is, the treatment fluids described herein may be used to dissolve the various components of such damage in order to increase the permeability of the subterranean formation, thereby leading to the possibility of increased production. The precipitation or accumulation damage in the subterranean formation may result from any source, which may include another stimulation operation.

In some embodiments, the treatment fluids described herein may be used in conjunction with drilling a wellbore penetrating a subterranean formation. For example, when used during drilling, the treatment fluids may desirably leave the subterranean formation conditioned with perfluorinated chelating agent so that precipitation can be subsequently mitigated at a later time. It is to be recognized, however, that the treatment fluids may also be used for proactive treatment of a subterranean formation at points in time other than in the drilling stage.

Embodiments disclosed herein include:

A. Methods for treating a subterranean formation. The methods comprise: providing a treatment fluid comprising a perfluorinated chelating agent having at least two carboxylic acid groups; introducing the treatment fluid into a subterranean formation; and complexing metal ions in the subterranean formation with the perfluorinated chelating agent.

B. Methods for treating a subterranean formation containing a carbonate material. The methods comprise: providing a treatment fluid comprising an aqueous carrier fluid and a perfluorinated chelating agent having at least two carboxylic acid groups, the treatment fluid having an initial pH of about 2 or lower; introducing the treatment fluid into a subterranean formation comprising a carbonate material; dissolving at least a portion of the carbonate material with the treatment fluid; and complexing metal ions in the subterranean formation with the perfluorinated chelating agent.

C. Systems for delivering a treatment fluid to a subterranean formation: The systems comprise a pump fluidly coupled to a tubular, the tubular containing a treatment fluid comprising an aqueous carrier fluid and a perfluorinated chelating agent having at least two carboxylic acid groups, the treatment fluid having an initial pH of about 2 or lower.

Each of embodiments A, B, and C may have one or more of the following additional elements in any combination Element 1: wherein the method further comprises dissolving at least a portion of a carbonate material in the subterranean formation with the treatment fluid.

Element 2: wherein dissolving at least a portion of the carbonate material comprises a dissolution process selected from the group consisting of decomposing a carbonate anion comprising the carbonate material with hydrogen ions, complexing a metal ion comprising the carbonate material with the perfluorinated chelating agent, and any combination thereof.

Element 3: wherein the carbonate material comprises calcium ions, magnesium ions, iron ions, or any combination thereof.

Element 4: wherein the treatment fluid contains no other acids or acid-generating compounds.

Element 5: wherein the treatment fluid further comprises a mineral acid or an organic acid selected from the group consisting of hydrochloric acid, hydrobromic acid, formic acid, acetic acid, methanesulfonic acid, chloroacetic acid, dichloroacetic acid, trichloroacetic acid, fluoroacetic acid, difluoroacetic acid, trifluoroacetic acid, and any combination thereof.

Element 6: wherein the treatment fluid further comprises a perfluorinated acid selected from the group consisting of

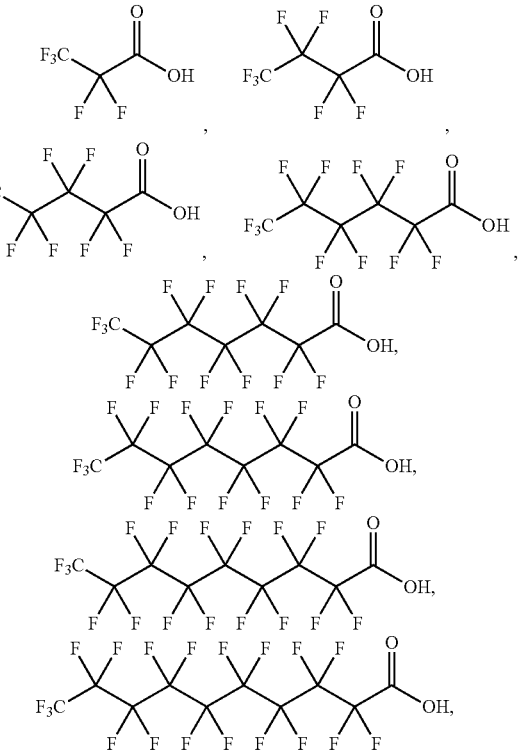

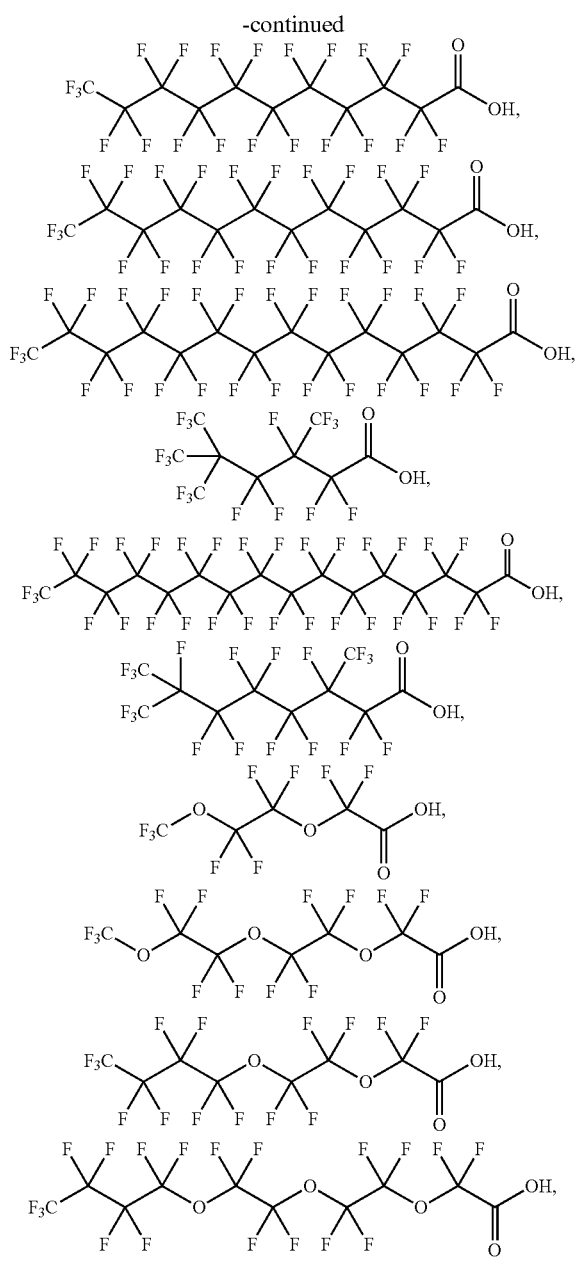

and any combination thereof.

Element 7: wherein the method further comprises dissolving a siliceous material with the treatment fluid in the presence of the metal ions.

Element 8: wherein the metal ions in the subterranean formation are generated from the siliceous material.

Element 9: wherein the perfluorinated chelating agent comprises a compound that is selected from the group consisting of

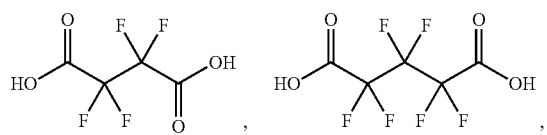

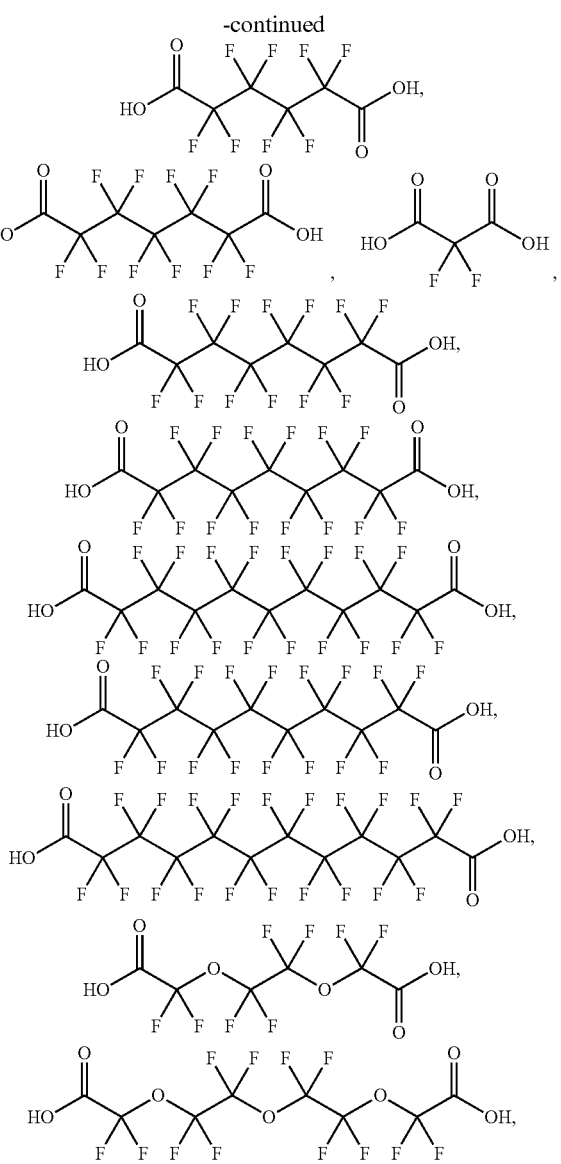

and any combination thereof.

Element 10: wherein the method further comprises introducing a second chelating agent into the subterranean formation, the second chelating agent comprising one fluorine group or less.

Element 11: wherein the second chelating agent is present in the treatment fluid.

Element 12: wherein the method further comprises complexing metal ions in the subterranean formation with the second chelating agent at a pH of about 2 or above.

Element 13: wherein the treatment fluid has an initial pH of about 2 or lower.

Element 14: wherein the treatment fluid is introduced into the subterranean formation above a fracture gradient pressure of the subterranean formation.

Element 15: wherein the treatment fluid is introduced into the subterranean formation below a fracture gradient pressure of the subterranean formation.

Element 16: wherein the second chelating agent is inactive for complexing metal ions at the initial pH of the treatment fluid, but becomes active as the treatment fluid at least partially spends and its pH rises.

By way of non-limiting example, exemplary combinations applicable to A, B and C include:

The method of A in combination with elements 1 and 5.
The method of A in combination with elements 1 and 6.
The method of A in combination with elements 1 and 7.
The method of A in combination with elements 1 and 9.
The method of A or B in combination with elements 5 and 9.
The method of A or B in combination with elements 6 and 9.
The method of A or B in combination with elements 7 and 8.
The method of A or B in combination with elements 9, 10 and 11.
The method of A or B in combination with elements 9 and 13.
The system of C in combination with elements 4 and 9.
The system of C in combination with elements 5 and 9.
The system of C in combination with elements 6 and 9.
The system of C in combination with elements 9 and 13.
The system of C in combination with elements 9 and 11.

To facilitate a better understanding of the embodiments of the present disclosure, the following examples of preferred or representative embodiments are given. In no way should the following examples be read to limit, or to define, the scope of the disclosure.

EXAMPLES

Examples 1 and 2

Dissolution of a Sandstone Core with a Treatment Fluid Containing Hexafluoroglutaric Acid and Ammonium Bifluoride Example 1: A sandstone core was eluted at 180° F. with an aqueous treatment fluid containing 5% hexafluoroglutaric acid by weight and 8.5% ammonium bifluoride by weight (corresponding to 6% hydrofluoric acid by weight). The treatment fluid had an initial pH of 4.25 and also contained 0.2% surfactant by weight. Elution fractions were then periodically collected and analyzed for the concentrations of various metal ions using ICP. Metal ion concentrations and the pH values of the elution fractions are shown in Table 1.

TABLE 1

| Sample Number | Al (ppm) | Fe (ppm) | K (ppm) | Si (ppm) | pH |
|---|---|---|---|---|---|
| A | 41.1 | 1069 | 195 | 7273 | 5.96 |
| B | 10.2 | 649 | 64 | 7888 | 6.03 |
| C | 2.5 | 461 | 54 | 8279 | 5.96 |
| D | 14.0 | 423 | 48 | 8734 | 5.95 |
| E | 10.4 | 338 | 48 | 8603 | 5.96 |
| F | 39.9 | 630 | 340 | 4352 | 5.71 |
| G | 309.8 | 81 | 132 | 540 | 3.97 |

Figure 2:
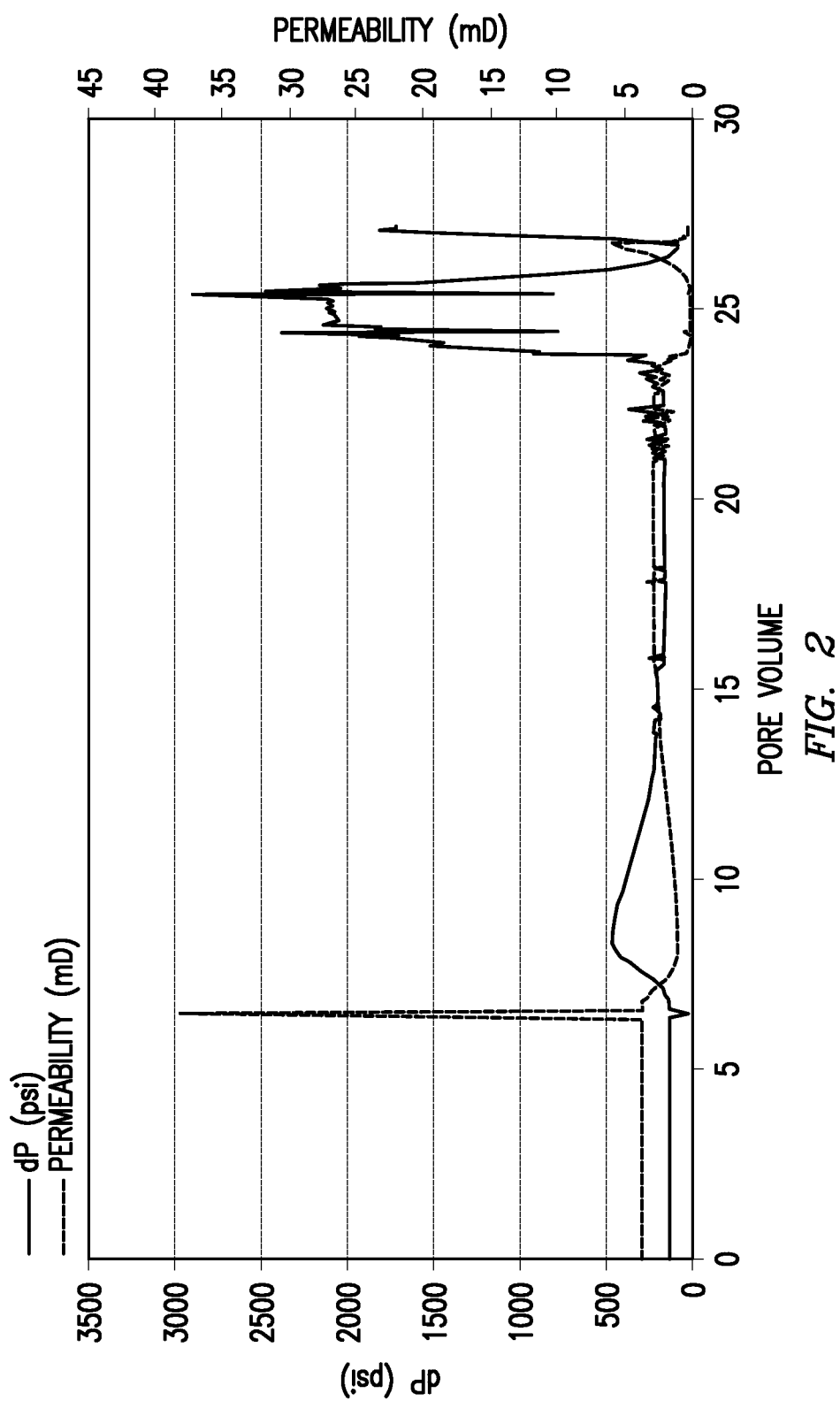
FIGS. 2-4 show illustrative plots of differential pressure and permeability as a function of pore volume in a sandstone core.
Figure 3:
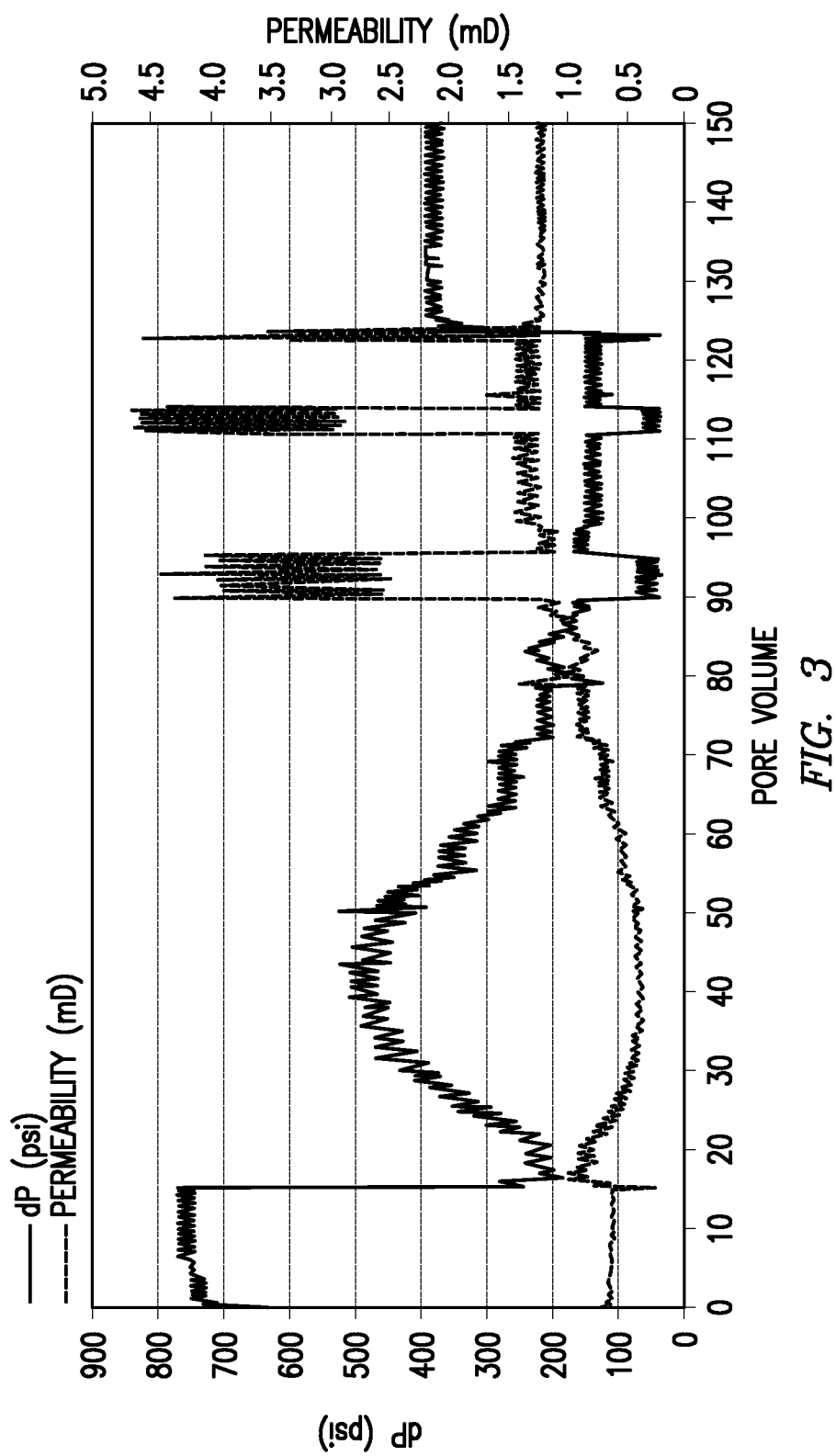

As shown in Table 1, high concentrations of dissolved silicon were maintained in the elution fractions, even in the presence of metal ions that can form precipitates in the presence of dissolved silicon, particularly at high pH values such as those obtained. Retesting of the elution fractions after standing for 3 days did not result in a significant change in the testing values. FIG. 2 shows an illustrative plot of differential pressure and permeability as a function of pore volume in the sandstone core. As shown, the permeability decreased, likely due to the high concentration of hydrofluoric acid that was present. Example 2: Testing was repeated as in Example 1, except the treatment fluid composition was the following: 1% hexafluoroglutaric acid by weight, 1.7% ammonium bifluoride by weight (corresponding to 1.2% hydrofluoric acid by weight), and 0.04% surfactant by weight. The pH remained 4.25. Metal ion concentrations and pH values of the elution fractions are summarized in Table 2. FIG. 3 shows an illustrative plot of differential pressure and permeability as a function of pore volume in the sandstone core.

TABLE 2

| Sample Number | Al (ppm) | Fe (ppm) | K (ppm) | Si (ppm) | pH |
|---|---|---|---|---|---|
| A | 729 | 509 | 195 | 1483 | 4.02 |
| B | 691 | 445 | 203 | 1512 | 3.93 |
| C | 713 | 416 | 227 | 1602 | 3.88 |
| D | 719 | 379 | 249 | 1665 | 3.94 |
| E | 687 | 341 | 260 | 1698 | 3.79 |
| F | 301 | 197 | 128 | 619 | 3.91 |
| G | 78 | 84 | 39 | 177 | 4.08 |
| H | 27 | 25 | 19 | 36 | 4.17 |

As shown in Table 2, high concentrations of dissolved silicon were again attained. Unlike Example 1, however, the permeability did not decrease in this Example, as shown in FIG. 3. It is believed that the superior permeability behavior of this example is due to the lower effective concentration of hydrofluoric acid, which is more consistent with that used in typical sandstone acidizing treatments.

Example 3

Figure 4:
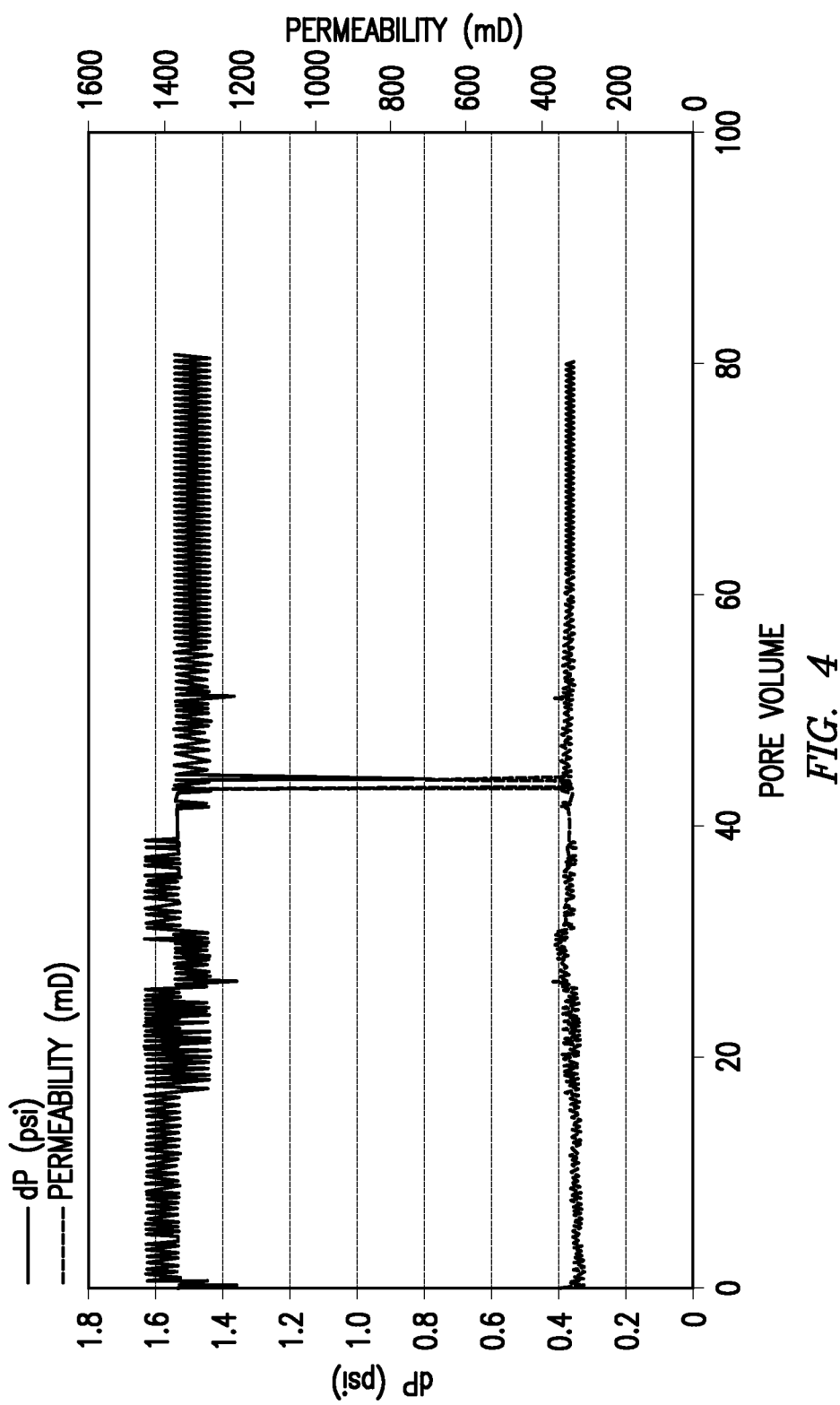

Treatment of A Sandstone Core with a Treatment Fluid Containing Hexafluoroglutaric Acid A sandstone core was eluted at 180° F. with a treatment fluid containing 10% hexafluoroglutaric acid by weight and 0.2% surfactant. The treatment fluid had a pH of 4.25. Metal ion concentrations and pH values of the elution fractions are summarized in Table 3. FIG. 4 shows an illustrative plot of differential pressure and permeability as a function of pore volume in the sandstone core.

TABLE 3

| Sample Number | Al (ppm) | Fe (ppm) | K (ppm) | Si (ppm) | pH |
|---|---|---|---|---|---|
| A | 1.2 | 1.8 | 32.6 | 7.4 | 7.54 |
| B | 1.2 | 0.9 | 21.5 | 5.0 | 7.67 |
| C | 1.0 | 0.8 | 19.2 | 4.8 | 7.74 |
| D | 0.9 | 0.7 | 15.6 | 4.5 | 7.70 |
| E | 0.8 | 0.7 | 14.5 | 4.4 | 7.71 |
| F | 0.8 | 0.7 | 14.1 | 4.3 | 7.75 |
| G | 0.9 | 0.8 | 17.4 | 4.3 | 7.76 |
| H | 0.8 | 0.7 | 12.8 | 4.2 | 7.77 |
| I | 0.8 | 0.6 | 12.0 | 4.2 | 7.75 |
| J | 0.8 | 0.7 | 11.6 | 4.0 | 7.76 |
| K | 0.8 | 0.6 | 11.7 | 4.1 | 7.79 |
| L | 1.0 | 0.9 | 11.8 | 3.8 | 7.72 |

As shown in Table 3, very little dissolution occurred. FIG. 4 likewise shows that that essentially no change in permeability occurred due to lack of dissolution of the core.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained in a particular implementation of the present disclosure. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
  providing a treatment fluid comprising a perfluorinated chelating agent having at least two carboxylic acid groups;
  introducing the treatment fluid into a subterranean formation; and
  complexing metal ions in the subterranean formation with the perfluorinated chelating agent.

2. The method of claim 1, further comprising:
  dissolving at least a portion of a carbonate material in the subterranean formation with the treatment fluid.

3. The method of claim 2, wherein dissolving at least a portion of the carbonate material comprises a dissolution process selected from the group consisting of decomposing a carbonate anion comprising the carbonate material with hydrogen ions, complexing a metal ion comprising the carbonate material with the perfluorinated chelating agent, and any combination thereof.

4. The method of claim 2, wherein the carbonate material comprises calcium ions, magnesium ions, iron ions, or any combination thereof.

5. The method of claim 1, wherein the treatment fluid contains no other acids or acid-generating compounds.

6. The method of claim 1, wherein the treatment fluid further comprises a mineral acid or an organic acid selected from the group consisting of hydrochloric acid, hydrobromic acid, formic acid, acetic acid, methanesulfonic acid, chloroacetic acid, dichloroacetic acid, trichloroacetic acid, fluoroacetic acid, difluoroacetic acid, trifluoroacetic acid, and any combination thereof.

7. The method of claim 1, wherein the treatment fluid further comprises a perfluorinated acid selected from the group consisting of

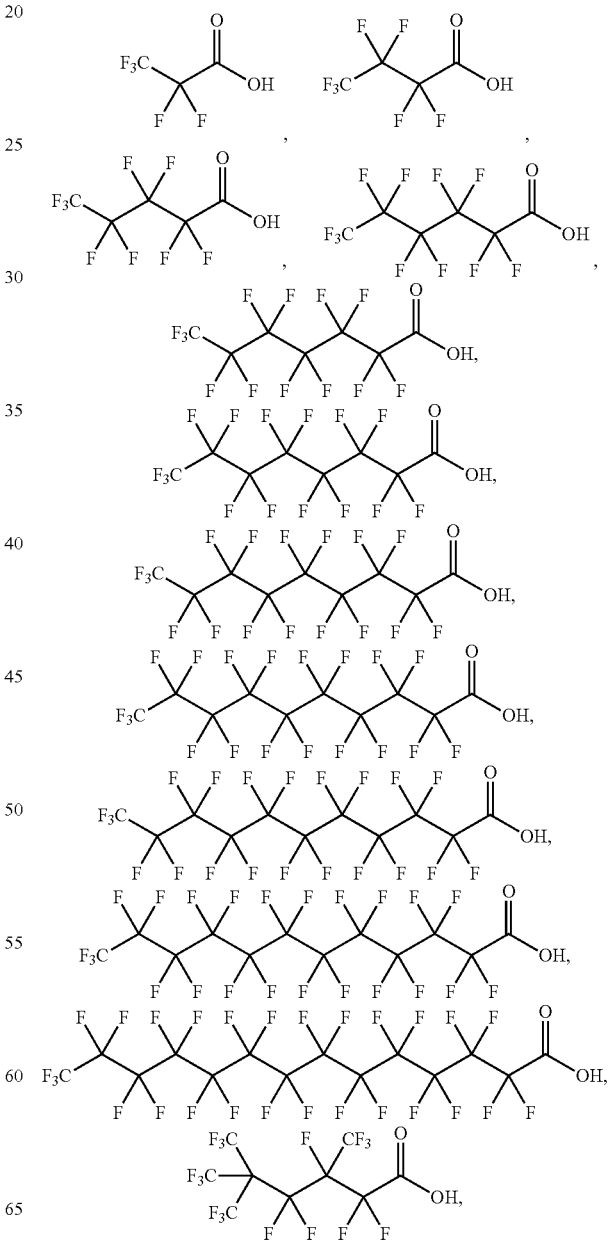

-continued

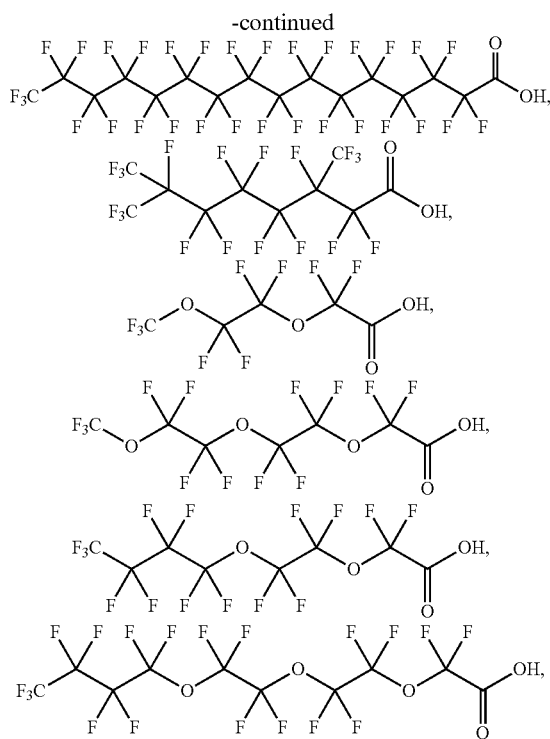

and any combination thereof.

8. The method of claim 1, further comprising:
dissolving a siliceous material with the treatment fluid in the presence of the metal ions.

9. The method of claim 8, wherein the metal ions in the subterranean formation are generated from the siliceous material.

10. The method of claim 1, wherein the perfluorinated chelating agent comprises a compound that is selected from the group consisting of

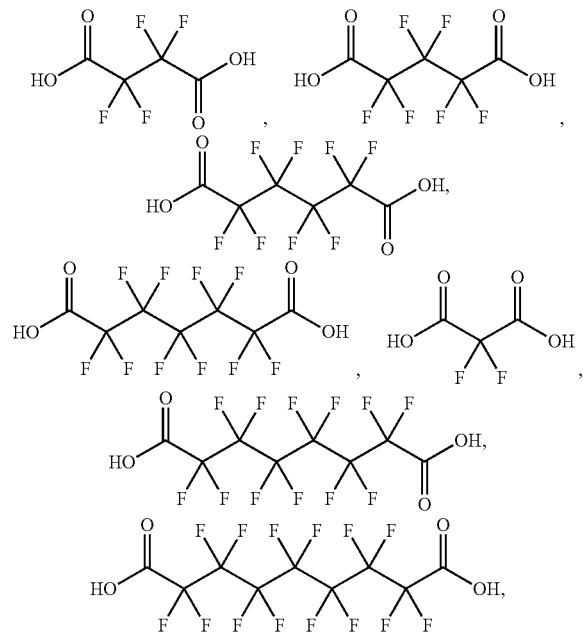

-continued

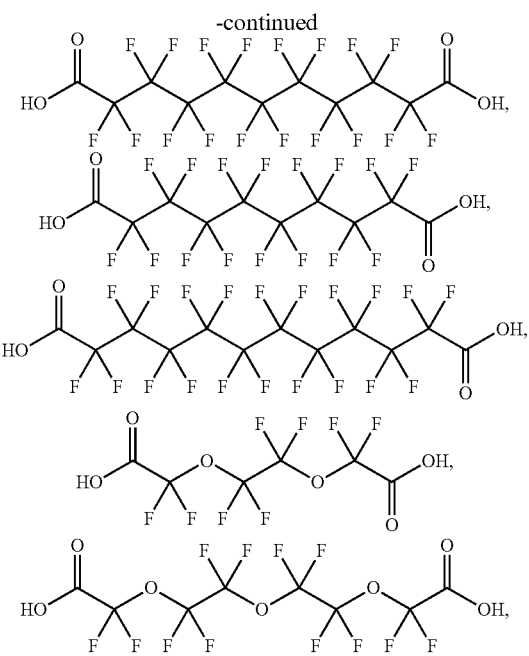

and any combination thereof.

11. The method of claim 1, further comprising:
introducing a second chelating agent into the subterranean formation, the second chelating agent comprising one fluorine group or less.

12. The method of claim 11, wherein the second chelating agent is present in the treatment fluid.

13. The method of claim 11, further comprising:
complexing metal ions in the subterranean formation with the second chelating agent at a pH of about 2 or above.

14. The method of claim 1, wherein the treatment fluid has an initial pH of about 2 or lower.

15. A method comprising:
providing a treatment fluid comprising an aqueous carrier fluid and a perfluorinated chelating agent having at least two carboxylic acid groups, the treatment fluid having an initial pH of about 2 or lower;
introducing the treatment fluid into a subterranean formation comprising a carbonate material;
dissolving at least a portion of the carbonate material with the treatment fluid; and
complexing metal ions in the subterranean formation with the perfluorinated chelating agent.

16. The method of claim 15, wherein the treatment fluid is introduced into the subterranean formation above a fracture gradient pressure of the subterranean formation.

17. The method of claim 15, wherein the treatment fluid is introduced into the subterranean formation below a fracture gradient pressure of the subterranean formation.

18. The method of claim 15, wherein the perfluorinated chelating agent comprises a compound that is selected from the group consisting of

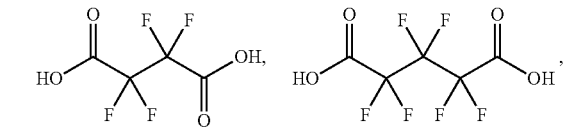

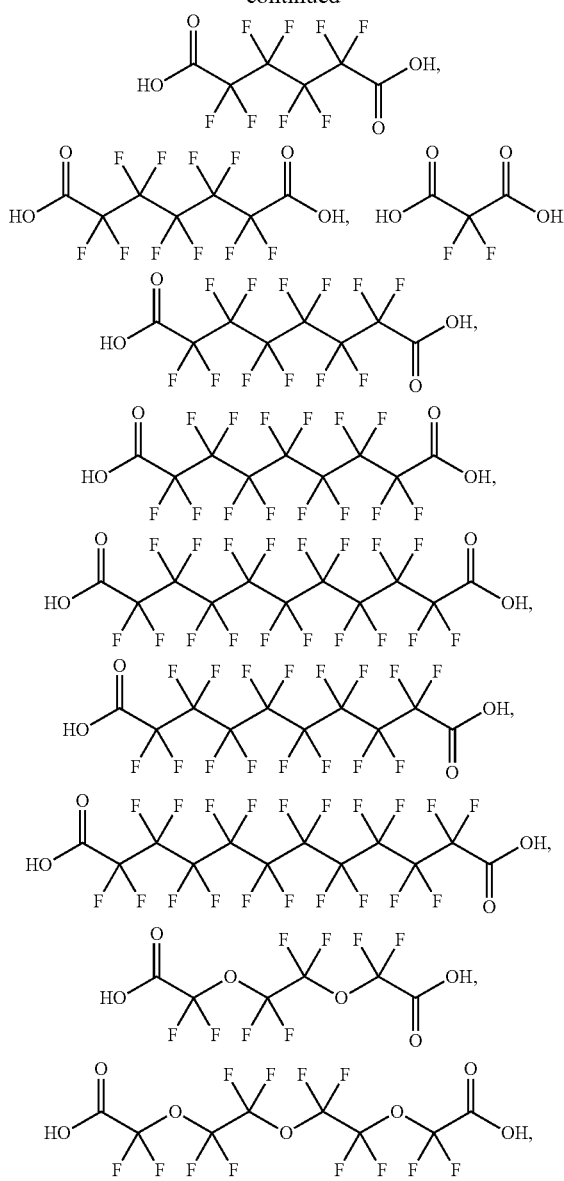

and any combination thereof.

19. The method of claim 15, further comprising:
introducing a second chelating agent into the subterranean formation, the second chelating agent comprising one fluorine group or less.

20. The method of claim 19, wherein the second chelating agent is present in the treatment fluid.

21. The method of claim 19, wherein the second chelating agent is inactive for complexing metal ions at the initial pH of the treatment fluid, but becomes active as the treatment fluid at least partially spends and its pH rises.

22. The method of claim 21, further comprising:
complexing metal ions in the subterranean formation with the second chelating agent at a pH of about 2 or above.

23. The method of claim 15, wherein the treatment fluid further comprises a perfluorinated acid selected from the group consisting of

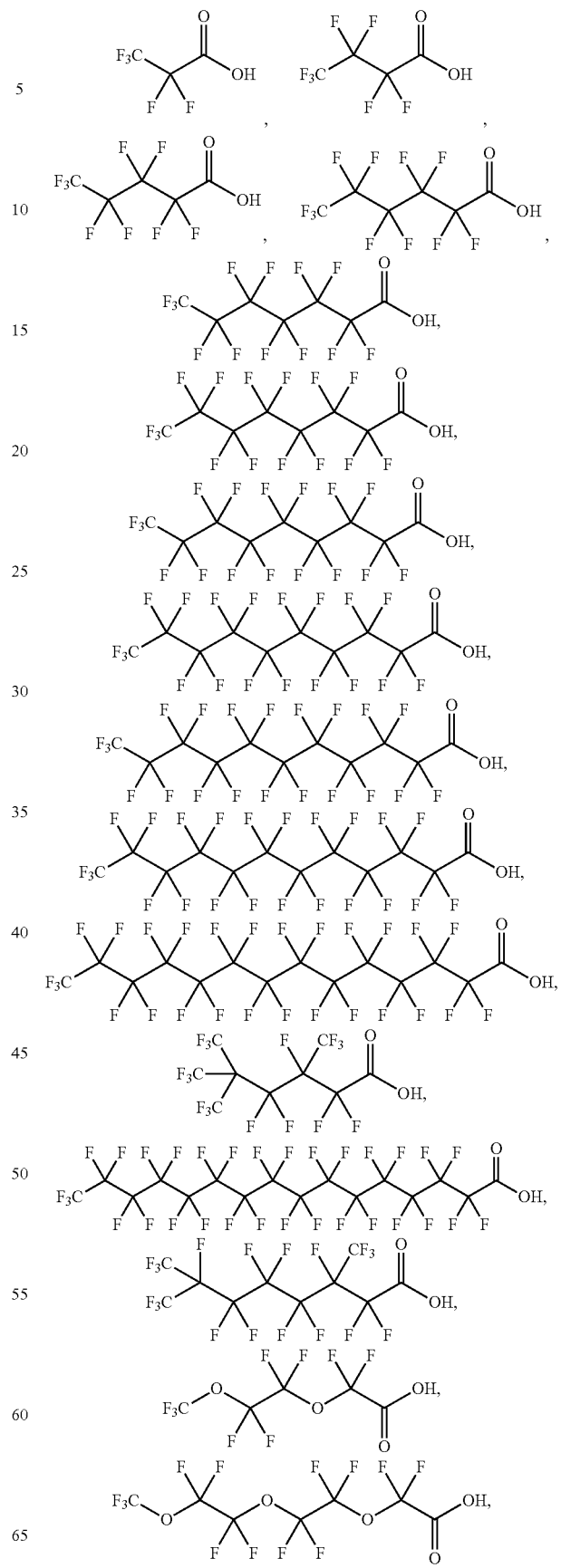

-continued

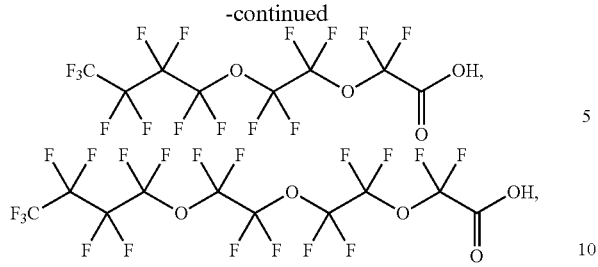

and any combination thereof.

24. The method of claim 15, further comprising:
dissolving a siliceous material with the treatment fluid in the presence of the metal ions.

25. A system comprising:
a pump fluidly coupled to a tubular, the tubular containing a treatment fluid comprising an aqueous carrier fluid and a perfluorinated chelating agent having at least two carboxylic acid groups, the treatment fluid having an initial pH of about 2 or lower.

* * * * *